No. 657,471. Patented Sept. 4, 1900.
F. L. VAN DUSEN.
MATCH MACHINE.
(Application filed Nov. 22, 1898.)
(No Model.) 8 Sheets—Sheet 1.

WITNESSES
INVENTOR
Frank L. Van Dusen
BY
ATTORNEYS.

No. 657,471. Patented Sept. 4, 1900.
F. L. VAN DUSEN.
MATCH MACHINE.
(Application filed Nov. 22, 1898.)

(No Model.) 8 Sheets—Sheet 2.

WITNESSES:
M. Bloudel.
Amos N Hart

INVENTOR
Frank L. Van Dusen.
BY Munn & Co.
ATTORNEYS.

THE NORRIS PETERS CO., PHOTO-LITHO., WASHINGTON, D. C.

No. 657,471. Patented Sept. 4, 1900.
F. L. VAN DUSEN.
MATCH MACHINE.
(Application filed Nov. 22, 1898.)

(No Model.) 8 Sheets—Sheet 3.

WITNESSES
M. B. Bloudel
Amos W. Hart

INVENTOR
Frank L. Van Dusen.
BY Munn & Co.
ATTORNEYS.

No. 657,471. Patented Sept. 4, 1900.
F. L. VAN DUSEN.
MATCH MACHINE.
(Application filed Nov. 22, 1898.)

(No Model.) 8 Sheets—Sheet 4.

WITNESSES:

INVENTOR
Frank L. Van Dusen
BY Munn & Co.
ATTORNEYS.

No. 657,471. Patented Sept. 4, 1900.
F. L. VAN DUSEN.
MATCH MACHINE.
(Application filed Nov. 22, 1898.)

(No Model.) 8 Sheets—Sheet 7.

INVENTOR
Frank L. Van Dusen
BY Munn & Co.
ATTORNEYS.

No. 657,471.  
F. L. VAN DUSEN.  
MATCH MACHINE.  
(Application filed Nov. 22, 1898.)  
Patented Sept. 4, 1900.

(No Model.)  
8 Sheets—Sheet 8.

WITNESSES:

INVENTOR  
Frank L. Van Dusen,  
BY Munn & Co.  
ATTORNEYS.

UNITED STATES PATENT OFFICE.

FRANK LESTER VAN DUSEN, OF OTTAWA, CANADA.

MATCH-MACHINE.

SPECIFICATION forming part of Letters Patent No. 657,471, dated September 4, 1900.

Application filed November 22, 1898. Serial No. 697,171. (No model.)

*To all whom it may concern:*

Be it known that I, FRANK LESTER VAN DUSEN, of Ottawa, Province of Ontario, Dominion of Canada, have invented a new and useful Improvement in Match-Machines, of which the following is a specification.

This invention is an improvement in that class of automatic machines which are adapted to cut match splints or sticks from a block of wood, dip the same in igniting compositions, and dry the latter, thus producing matches complete and ready for immediate use.

The construction, arrangement, combination, and operation of parts are as hereinafter described, the novel features being indicated in the claims.

In the accompanying drawings, eight sheets, Fig. 8ª is a detail section more specifically hereinafter referred to. Fig. 10 includes a perspective view and cross-section of the splint-socket and guide-plate 28, a perspective view of the body or main portion of the cutter-head J, and a perspective view of the slidable abutment-plate 25, having a raised flange 25ª. Figs. 11, 12, and 13 are vertical sections illustrating the operation of the splint-cutting mechanism and attached devices for forcing and guiding splints severed from a block into the sockets in the slats of an endless traveling chain or carrier. Fig. 14 is a slat having a triangular form of socket for match-splints. Fig. 15 includes two perspective views of the worm-wheel employed for moving the endless splint and match carrier. Figs. 16 and 17 are enlarged vertical sections illustrating the construction and operation of the mechanism for ejecting the completed matches from the endless traveling carrier. Fig. 18 is a detail partly-sectional plan of the match-ejector proper.

Figure 1:
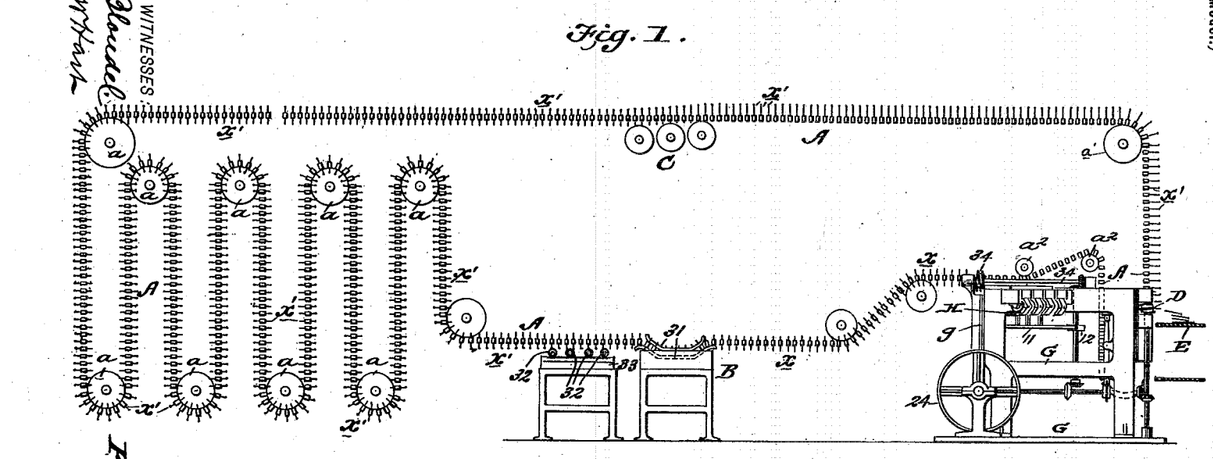
Figure 1 is a diagrammatic representation of the entire machine.
Figure 2:
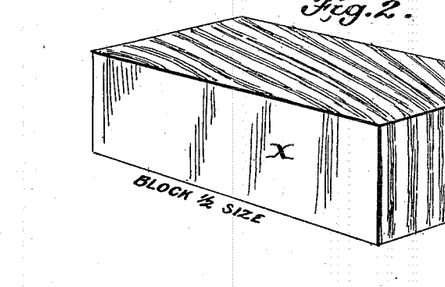
Fig. 2 is a perspective view of one of the wooden blocks, half-size, from which match-splints are cut.

Referring in the first instance to Fig. 1, it will be seen that the match sticks or splints $x$, which are severed from rectangular blocks X, such as shown in Fig. 2, are inserted into sockets in a carrier A, composed of metal slats or bars that are loosely connected to form an endless traveling chain by which the splints $x$ are successively carried through or dipped in the sulfur or paraffin bath B, then over rolls working in vats containing the igniting composition, then over a series of pulleys $a$, arranged in a drying-room, thence over rolls C, arranged in an inclined plane for the purpose of forcing the matches $x'$ up in the slats or bars of the carrier A, then over a pulley $a'$, from which they descend to the ejecting mechanism at D, whereby they are delivered upon a transverse traveling belt E, that conveys them to the packing department. From such point of ejectment of the completed matches $x'$ the slat chain or carrier A passes downward, then upward over pulleys $a^2$, by which it is guided to the splint cutting and severing apparatus, where the operation begins anew. The block-feeding, splint-severing, and match-ejecting mechanisms and other related or coöperating parts are arranged in a strong vertical skeleton frame G, which is shown enlarged in Figs. 3, 5, 7, and 8. I will proceed to describe the said mechanisms and parts with the requisite detail.

Figures 3, 4:
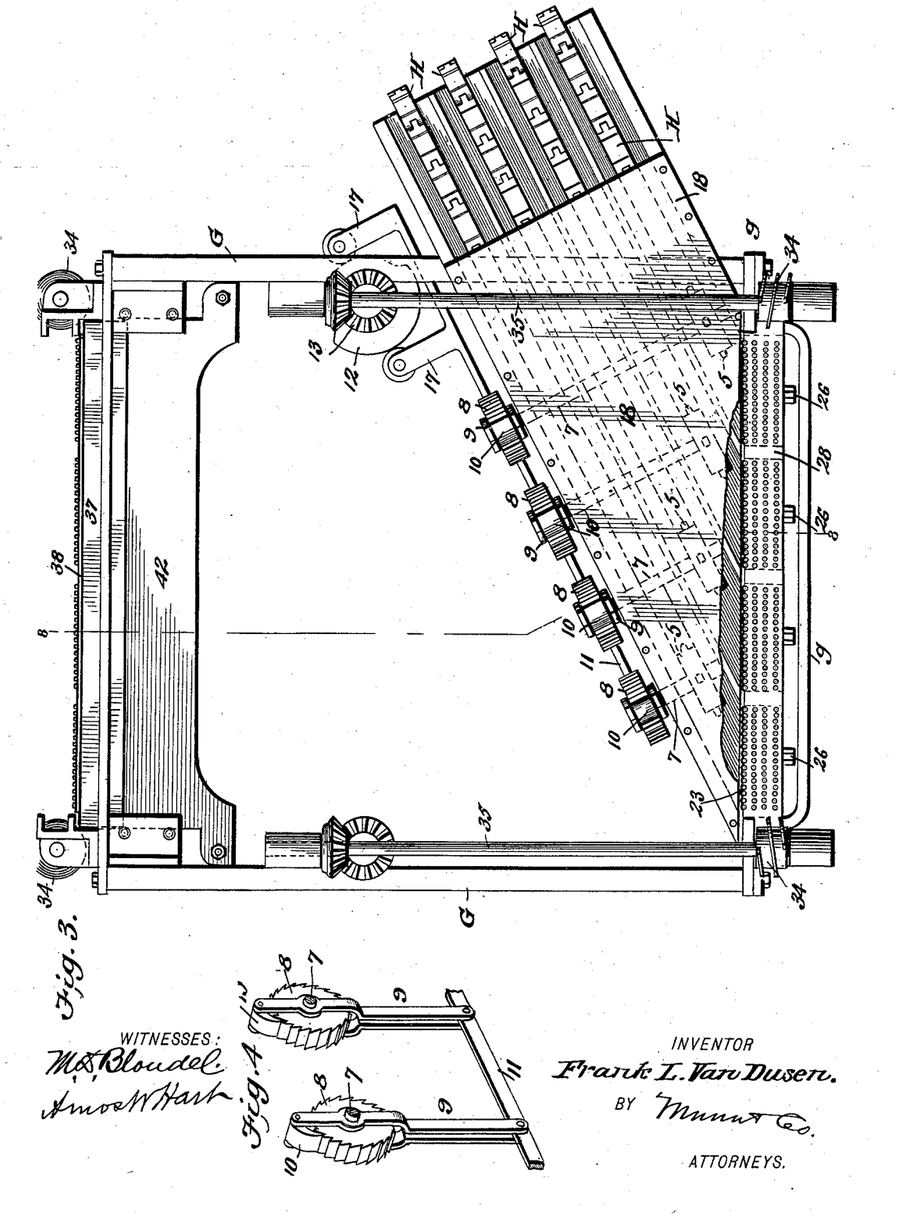
Fig. 3 is a plan view of a portion of the machine, which includes block-feeding, splint-cutting, and other important mechanisms, part being broken away.
Fig. 4 is a perspective view of ratchet, pawl, and lever mechanism for feeding the wooden blocks to the splint-cutters.
Figures 5, 6:
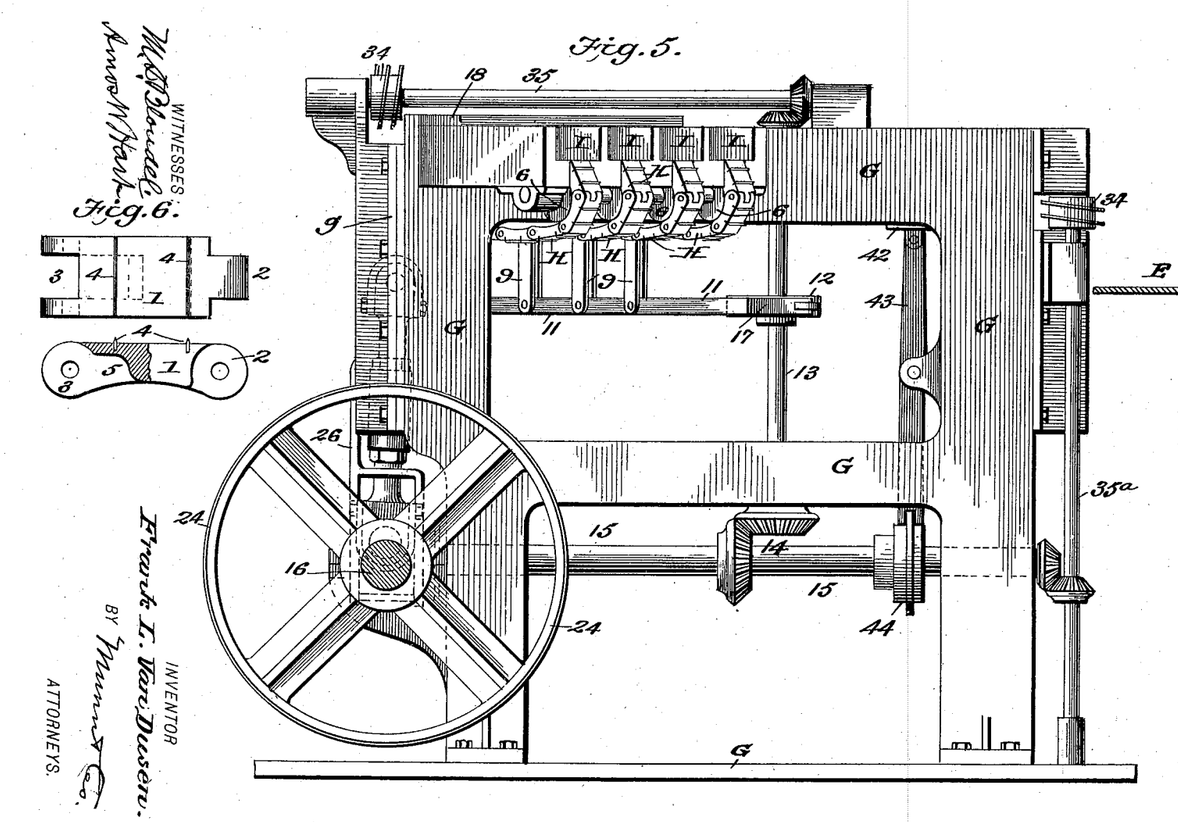
Fig. 5 is a side elevation of the portion of the machine shown in plan in Fig. 3.
Fig. 6 is a perspective in plan and side view, part being broken away, of one of the links composing the endless chain or carrier employed for feeding the wooden blocks to the splint-cutters.
Figure 7:
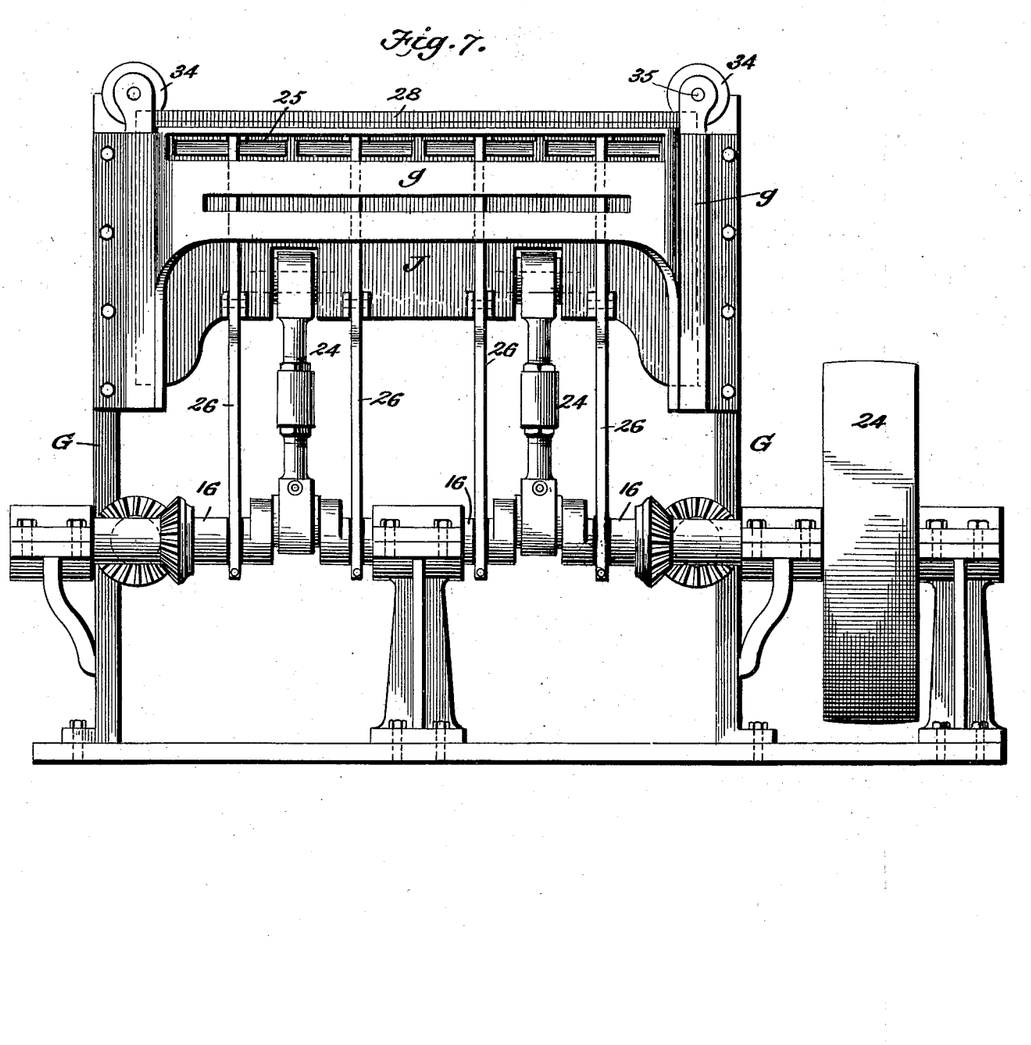
Fig. 7 is an end or front face view of the portion of the machine shown in plan in Fig. 3.
Figures 8, 8A:
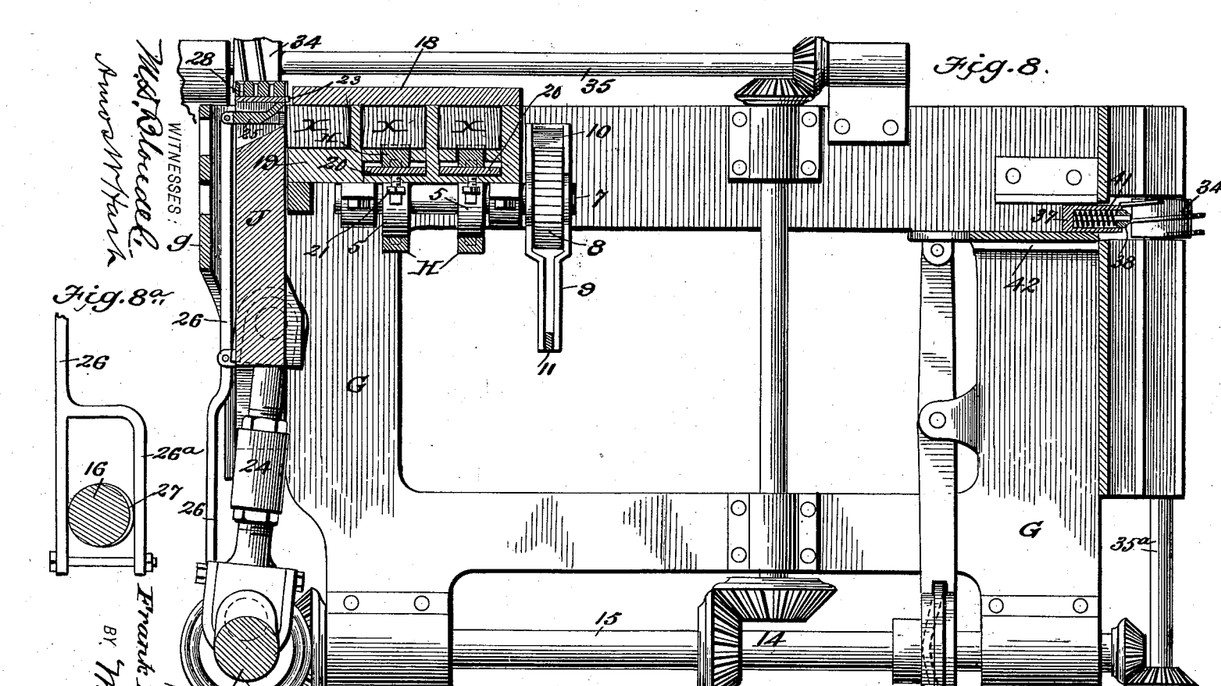
Fig. 8 is an enlarged vertical longitudinal section on line 8 8 of Fig. 3.
Figure 9:
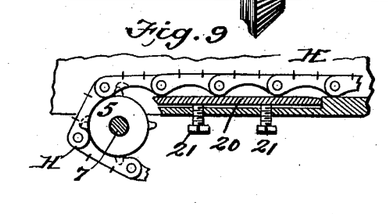
Fig. 9 is a detail section of a block-carrier.

The blocks X, from which the match splints or sticks are to be severed, are placed successively end to end on endless chains H, (see Fig. 3,) which are arranged to travel in parallel guideways I, forming a horizontal attachment of the top portion of the skeleton frame G, and arranged diagonally, Fig. 3, with reference to the several cutter-heads, Figs. 7 and 8, that reciprocate vertically at one side of said frame G. As shown in Fig. 6, these several chains or carriers—in this instance four are employed—are composed of a series of similar links, each having a rounded tenon 2 at one end and a recess or socket 3 at the other adapted to receive such a tenon, whereby the links are adapted to be pivotally connected by transverse rivets or bolts. Each link 1 is provided on its upper side with transverse ribs or teeth 4, that abut or take into the splint-blocks X and prevent the latter slipping backward while being carried along by the chains H. The under sides of the links 1 are also provided with a recess 5, Fig. 6, adapted to receive a tooth of sprocket or feed wheels 6, over which the chains H pass. Such sprockets 5 are shown in dotted lines, Fig. 3, and are keyed upon horizontal parallel shafts 7, Fig. 4, having ratchet-disks 8 fixed on their outer ends. One sprocket and shaft are required for each block-carrier or chain H. The latter obviously requires to remain motionless when the cutting or splint-severing mechanism is operating, and hence intermittent movement must be imparted to it. In other words, it is advanced only at the time when the splint-cutting mechanism is receding from a block X. To impart intermittent rotation to the sprocket-shafts 7, pendent levers 9, Fig. 4, are pivoted on the latter and carry pivoted gravity-pawls 10, that engage the ratchet-disks, while the lower ends of such levers are pivoted to a bar 11, which is reciprocated by means of a cam 12, Figs. 3 and 5, mounted on a vertical shaft 13, geared at 14, Fig. 5, with a shaft that derives motion from the drive-shaft 16. (See also Fig. 8.) The means for connecting bar 11 with the cam 12 are horizontal arms 17, Fig. 3, carrying antifriction-rollers that run in contact with said cam, as shown. As the chains or carriers H advance intermittently they carry the wooden blocks X forward beneath a plate 18, that covers the guideways I up to the cutting mechanism. The chains H do not extend so far as the cover 18, and the blocks X are held firmly between said cover and the base-piece 19, Fig. 8, while being cut up into splints. In order to insure the uniform forward feed of the blocks X, I provide means for adjusting the chains H higher, say, when required to take up wear, the same consisting of a plate 20, Figs. 8 and 9, arranged in the bed or floor of each chain-guideway I, and set-screws 21, arranged beneath such plate 20 and supporting the same, as shown. It is apparent that by rotating said screws 21 the plate and chain H will be adjusted accordingly. This plate 20 is arranged as close as practicable to the place where the chains turn down through the beds of the guideways.

I come now to description of the cutting or splint-severing mechanism. There being four block-guideways I and carriers H, there is necessarily a like number of cutter-heads J, and these, as shown best in Figs. 11, 12, and 13, may consist of a solid block having a laterally-projecting ledge in which the cutters proper, 23, are formed. These blocks X are rigidly connected, and they are reciprocated vertically by means of thick pitmen or connecting-rods 24 and the driving crank-shaft 16. The latter is arranged horizontally in bearings at one side of frame G and provided with a band-wheel 24. The combined cutter-heads J are guided vertically in parallel ways and work across the mouths or exits of the four guideways I. (See Fig. 8.) As shown in Fig. 11 a cutter-head J is at the top or upward limit of its stroke, and a row of circular cutters proper, 23, forming an attachment or part of it, are shown projecting over a splint-block X and ready to begin a downward cut. In Fig. 12 the cutter-head J is shown at the limit of its downstroke, and a series of splints x have been severed and are standing in the cutters proper, 23. The splints thus severed are next to be guided and projected into the sockets of the splint-carrier A. The latter is composed of transverse parallel slats or bars 24, hinged together or flexibly connected by means of lateral perforated ears that are pivoted together, as shown in Figs. 12 and 13. Each slat or bar 24 has a series of vertical apertures adapted to serve as sockets or holders for match-splints, and said sockets have a peculiar form for a purpose hereinafter stated. The carrier A is moved intermittently in one direction by means that will also be described hereinafter. It will be noted in Fig. 12 that a section of the splint-carrier A is directly over the cutter-head J and that the splint-sections 24 in one slat are empty. The splints x, severed, as before described, by the downstroke of the cutters 23, are now to be pushed upward into the sockets of such slat, and this is done in the next upstroke of the cutter-head J. (R represented in Fig. 13.) The chief means for effecting this result is a slidable plate 25, arranged in a transverse slot in the cutter-head J. The same is shown detached in Fig. 10. It has a flat body and a raised oblique portion or flange 25$^a$, having an acute-angled edge that wedges under the row of severed splints x when the abutment-plate 25 is slid forward, as shown in Fig. 13, by positively-acting mechanism, and then, the cutter-head J being raised, the said flange 25$^a$ rises with the row of splints and prevents them from sliding back through the cutters 23 while they are being forced into the triangular slat-sockets 24, as shown. The means for reciprocating said plate 25 horizontally, as required to thus project and then retract it to the position shown in Figs. 11 and 12, are levers 25, Figs. 5, 7, 8, and 8ª, which are operated by cams 27 on the drive-shaft 16. Said levers 26 are pivoted to the cutter-heads J and necessarily move with them, and their lower ends are slotted or provided with elongated yokes 26ª, Fig. 8ª, that embrace the shaft 16. It is obvious that the elongations of the slots or yokes 26ª allow the levers 26 to reciprocate with the cutter-heads J without affecting the action of the cams 27, required to vibrate said levers and reciprocate the plates 25.

The arrangement of the abutment-plate 25, cutters or cutter-plate 23, and splint-socket plate 28 is such that their vertical traverse is merely the height of the block X from which the splints are severed, which is an important feature, since it enables a maximum number of cuts to be made in a given time. The details of arrangement are as follows: On the top of the cutter-head proper, J, is secured a flat splint-guide plate 28. (See Figs. 8 and 10 to 13.) The said plate 28 has vertical splint-grooves 29 in its front or inner edge and a series of splint-sockets 30 in its body portion. As the plate 25 raises a row of splints $x$, as before described, as shown in Fig. 13, the said splints $x$ are supported and guided into the sockets 24 of the slat that lies directly over the aforesaid guide-grooves 29. Further, when the cutter-head J descends, the guide-plate 28 moving with it, the slat chain or carrier A advances the length of the space between two slat-sockets 24, and consequently when the cutter-head J again rises the row of splints $x$ that were last guided by grooves 29 and inserted in slat-sockets 24 enter the sockets 30 in said plate 28, as shown in Fig. 13, and are thereby held or guided while being forced farther into the slat-sockets 24, as shown in Fig. 12. In other words, in the first instance the plate or splint-sticker 25 forces the splints $x$ about one-third their length into the sockets of a slat and at the next operation—i. e., rise of the cutter-head—the same splints are projected farther through the sockets, so that they project therefrom equidistantly on opposite sides, as shown in Fig. 12.

In some machines of this class the splint and match carrier is caused to travel in the opposite direction from mine in order to prevent the top of the cutter-head striking the lower ends of the splints upon making the stroke directly after that in which the splints have been forced up and stuck into the carrier, and the splints also have to be raised high enough to clear the top of the cutter-head guideways and feedworks. I have overcome this difficulty by the provision of the guide-and-socket plate 28, which forms practically the top of the cutter-head and stiffens and braces the comparatively-thin cutter proper. This plate 28 allows the splints to be carried over the cutter-head without being interfered with and permits the cutter-head to come close up to the bottom of the carrier, leaving the splints, Fig. 13, in the proper position for dipping. Another reason why I am able to shorten the stroke of the cutter is that the abutment-plate 25 has a raised or angular thin-edged flange which is moved forward by positively-acting means, so that at the time the cutter-head completes its stroke said flange instantly engages the splints just severed and begins to raise them as the cutter recedes, whereas in other machines of this class the sliding abutment-plate ordinarily has a straight or vertical edge and cannot be shoved forward until carried down far enough to clear the lower edge of the block from which the splints are cut, or, if provided with an angular edge, it is pivoted in such manner that it is impossible it can engage and begin to raise the splints at the instant the cutter has completed its stroke, since (for one reason) it must swing in the arc of a circle, for which movement due space must be provided underneath the cutter. When the splints are raised, they enter the carrier-socket before the cutter-head has made half its upstroke and are pushed about half-way into said sockets, and since it is impossible for them to come back more than one-sixteenth of an inch (which is the space allowed for the cutter to clear the top of the block from which the splints are severed) they need not be held very tight in the sockets or only sufficiently so to sustain them while being finished and dried. To avoid having the cutter-head strike the lower ends of the splints and shove them up flush with the carrier, I provide the plate 28, whose sockets receive the support and guide the splints as they are crossing over the cutter-head, which movement would otherwise be impossible, since the cutter-head is necessarily wider than the space between the rows of splints. If the cutter-head specified be made as narrow as the space, it would require a carrier six hundred feet in length to hold as many splints as one three hundred feet long suffices for in my machine, and less than this would not allow time for the matches to dry after dipping.

From the splint-sticking mechanism the carrier A takes the splints $x$ to the paraffin or sulfur dipping vat B, (shown in Fig. 1,) where the carrier A is depressed about three-fourths of an inch in order to dip the splints to the proper depth by means of fixed and downwardly-curved side guides 31. Thence the dipped splints $x$ are carried to and over rollers 32, working in composition-vats 33, which are more fully described hereinafter, and then to and through the drying-room, where the carrier is disposed in parallel vertical convolutions and travels on pulleys $a$, as shown. From the drying-room the endless carrier A takes the now complete matches $x'$ over an inclined plane composed of a set of rollers C, Fig. 1, which are arranged to successively push the matches $x'$ upward and outward in the slat-sockets 24 preparatory to their final ejectment therefrom. Said rollers C are preferably three in number and are arranged horizontally parallel, but in successively-higher planes, the first being located lowest, the second higher, and the third highest, as shown. The first roller serves to push the matches $x'$ upward a certain distance, the second roller a greater distance, while by the third or highest roller they are pushed up until their shanks are flush with the under side of the slat-sockets 24 of the carrier A.

The means for moving the carrier A intermittently are worm-wheels 34, (see especially Figs. 3 and 5,) mounted on shafts 35 35ª, that are arranged, respectively, horizontal and vertical in bearings in frame G and geared intermittently with the drive-shaft 16. The two spiral flanges of these worm-wheels 34 34ª engage the ends of the splint and match carrying slats of carrier A, and although constantly revolved they act on the slats intermittently to force the same forward. Thus the carrier has dwells of sufficient length to allow insertion of splints $x$ therein, and during the same time the match-ejecting mechanism also operates as hereinafter described.

The match-ejecting mechanism is constructed and operates as follows: As shown in Figs. 18, 16, and 17, the carrier A passes down the front of the frame G in suitable side guides and each slat comes opposite the ejecting devices D and dwells for a moment. The said devices D consist of a box-like holder and guide 37, Fig. 18, for a metal bar 38, having a series of transverse holes and coincident conical projections 39, that are the same in number as and are adapted to enter the conical sockets 24 in the slats of carrier A. A series of parallel horizontal pins 40 are fixed in the bottom of the box 37 and are coincident with and work in the holes in the bar 38. A spiral spring 41 encircles each pin 40. The outer ends of the pins are normally flush with the apexes of the cones 39 of bar 38, and the sides of the box 37 are spaced apart, so as to receive a carrier-slat between them.

The box 37 is fixed on a horizontal plate 42, which is adapted to slide horizontally in suitable guideways in frame G. The means for reciprocating said plate 42, and thereby the ejecting mechanism proper, are levers 42, (shown best in Fig. 8,) which are arranged vertically and pivoted at the middle of their length and slotted at their lower ends to adapt them for engagement with the flange of a cam-wheel 44, keyed on horizontal shaft 15. It will now be understood that as the match-carrier A is arrested at the proper time the cams 44 cause the lever 43 to throw the plate 42 and attached ejecting mechanism forward into the position shown in Fig. 12, whereby the sides of box 37 embrace or inclose the opposite slat of said carrier, the conical points 39 of the bar 38 enter the sockets in said slat, and the pins 40 are guided and forced into the sockets 24, thus pushing out the matches $x'$, which fall upon an endless traveling delivery-belt E with their heads all lying in one direction. It will be noted that the springs 41 allow the bar 38 to be pushed backward in box 37 to the distance the pins 40 require to pass through the slat-sockets 24. So soon as the matches $x'$ have been thus ejected the cam 44 retracts the box 37 and its attachments, and the carrier A moves down the distance required to bring another match-carrying slat opposite the ejecting devices D, when the latter repeat the operation above described. The correspondence in construction and arrangement between the conical projection 39 of bar 38 and the funnel-shaped sockets 24 of a carrier-slat holds the latter steady in place and enables the ejecting-pins 40 to be guided exactly into the sockets 24, so that there is no danger of mischance in the ejecting operation.

Figure 19:
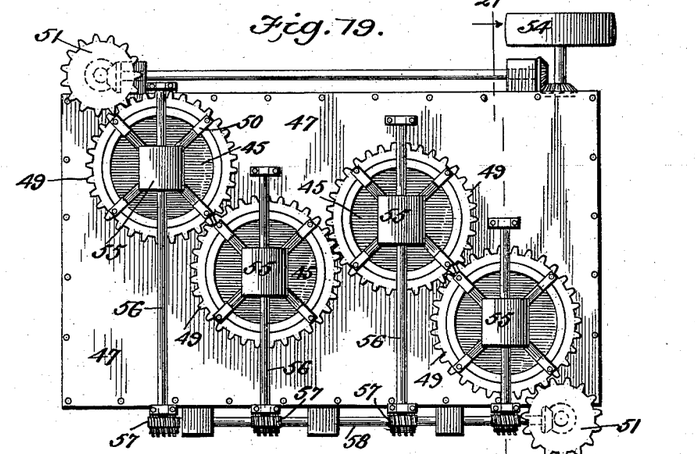
Fig. 19 is a plan view of the portion of the machine for applying composition to the splints previously dipped in a sulfur or paraffin vat.
Figure 20:
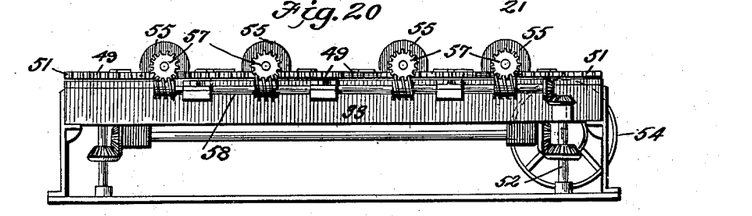
Fig. 20 is a side view of such composition-applying apparatus.
Figure 21:
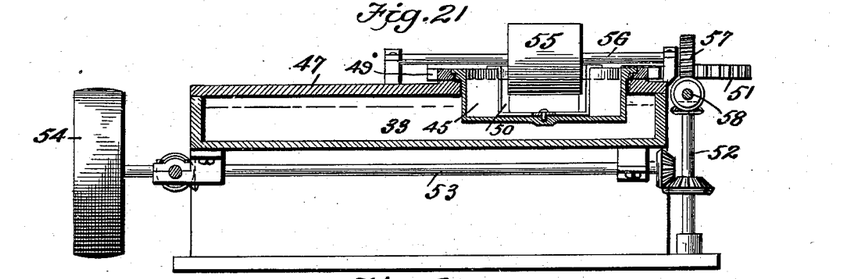
Fig. 21 is a vertical cross-section on line 21 21 of Fig. 19.
Figure 22:
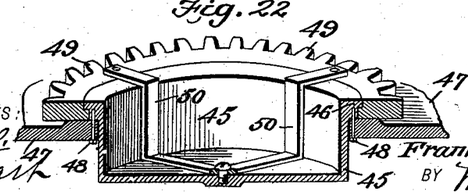
Fig. 22 is an enlarged perspective section of one of the composition-vats and the annular gear for rotating it.

The composition-vats 45, Figs. 19 to 22, are circular and arranged in the usual hot-water bath 33. The chief feature of the apparatus is the adaptation for speedy and convenient removal of one or more of such vats 45 in case it becomes necessary by accidental ignition of the composition. For this purpose each vat 45 is provided with a circular horizontal flange or ledge 46, Fig. 22, that rests on the adjacent edge of the top 47 of the water-bath. To hold the vat 45 from rotation, dowel-pins 48 are fixed in the said top 47 and project vertically into sockets in the ledge 46, as shown. An annular spur-gear 49 surrounds each vat-ledge 46, the two having engaging rabbets or shoulders, as shown, that of the ledge overlapping the gear, so that if the latter be raised the vat will be also. Stirrers and scrapers 50 are arranged in each vat 45, the same being angular bars that work close to the bottom and sides of the vat and are attached to the upper side of the gear 49. The stirrers 50 intersect and are pivoted at the center of the vat. The gears 49 of the several vats—four in number—mesh, Fig. 19, and therefore rotate together. Rotation is imparted to all simultaneously by the small gears 51, arranged at diagonally-opposite points on the water-bath 33. These gears are keyed on vertical shafts 52, that derive rotation from a drive-shaft 53, carrying a band-pulley 54, as shown in Fig. 19. When the composition of a vat 45 becomes ignited or it is desired to remove the vat for any other reason, the rotation of said drive-shaft 53 is arrested and a suitable hoisting device or apparatus is applied for raising a gear 49 and vat 45 together. Then the operation of the apparatus may be continued with the other vats, so that the machine may be run at three-fourths capacity. It is apparent that one of the end gears and vats may be removed, or both center gears and vats at the same time, without preventing operation of the others. Another feature is the zigzag arrangement of the vats, whereby space is economized in the heater and at the same time carriers are adapted to run over separate rollers, and any one may be stopped and a vat removed without interfering with or arresting the operation of the other carriers or removal of the other vats. A roller 55 runs in each vat 45 to take composition and apply it to the dipped splints *x* as they travel over it. Each roller 55 is mounted on a shaft 56, that is geared with a shaft 58, arranged alongside the water-bath and deriving motion from one of the vertical shafts 52, before referred to. These roller-shafts are made easily detachable from their bearings to allow removal of the vats and annular gears, as before described.

As shown in Fig. 14, the splint-sockets in the carrier-slats are triangular in cross-section at any point between their flared mouths. This shape has been found to be practically efficient for holding a round or three-quarter-match splint, but will not hold a half-splint. In other words, a perfect splint sticks in such sockets with due friction, and so does a three-quarter splint, since it is in contact with and compressed between a sufficient number of sides of the sockets; but a half-splint fails to find due compression and support in the sockets, and hence falls out. Thus the carrier A automatically selects and retains such splints as are suitable for use as matches when dipped and tipped, but rejects the half or worthless splints, so that the expense of removal of the same manually from the perfect matches is avoided.

What I claim is—

1. The combination, with a series of guideways and a series of endless block-carriers, or chains, adapted to travel in the same, of a like series of sprockets and shafts having ratchet-disks keyed on their outer ends, pendent levers pivoted on said shafts and having pawls that engage the ratchets, a bar connecting the lower ends of said levers, and having parallel lateral arms, and a rotatable cam arranged between said arms, substantially as set forth and for the purpose specified.

2. The combination with the fixed guideways for sliding splint-blocks, and an endless splint-carrier having perforated slats, of the cutter-head having an opening and horizontal guideways, the abutment-plate adapted to slide in the latter and having a projecting flange, the cutter-plate fixed directly over the abutment-plate, the splint-guide plate 28 fixed upon the cutter-plate and having a series of splint-sockets adapted to register with those in the splint-carrier, and means for reciprocating the cutter-head, whereby the aforesaid abutment-plate, cutter-plate, and splint-guide plate are reciprocated together and the limits of movement are the height of the splint-block, as shown and described.

3. The combination with the block guideways and cutter-heads reciprocating as specified, of a crank-shaft and pitmen, abutment or splint-elevating plates arranged in slots in the cutter-heads as specified, levers pivoted to said cutter-heads and having their lower ends formed as elongated yokes, and cams on said crank-shaft which are embraced by said yokes, as shown and described, whereby the levers reciprocate the abutment-plates horizontally, while the cutter-heads reciprocate vertically, as shown and described.

4. In a match-machine, the endless splint and match carrier, composed of solid slats having sockets, which extend through the latter, and are triangular in cross-section, and made funnel-shaped at both ends, as shown and described.

5. The combination with a splint and match carrier having match-receiving sockets, of match-ejecting mechanism comprising in part a pin-guide bar having projections adapted to engage such sockets, and pins working through said bar and adapted to project into the sockets, substantially as shown and described.

6. The combination with a guide-frame and a splint and match carrier composed of slats or bars loosely connected and having a series of match-sockets which have funnel-like entrances, of the ejecting mechanism comprising a bar having a series of conical projections coinciding with the aforesaid sockets and adapted to enter the same, pins working through the said projections and adapted to enter the sockets, substantially as and for the purpose specified.

7. The combination with a guide-frame and a splint and match carrier composed of slats or bars loosely connected and having a series of match-sockets which have funnel-like entrances, of the ejecting mechanism comprising a bar having a series of conical projections coinciding with the aforesaid sockets and adapted to enter the same, a series of pins working through the said projections and adapted to enter the sockets, a guide-frame to which said pins are attached, and springs interposed such frame and the bar having conical projections, as aforesaid, substantially as shown and described, for the purpose specified.

8. The combination with a guide-frame and a splint and match carrier composed of slats or bars loosely connected and having a series of match-sockets which have funnel-like entrances, of the ejecting mechanism comprising a bar having a series of conical projections coinciding with the aforesaid sockets and adapted to enter the same, a box-like guide-frame whose top and bottom sides are adapted to embrace a carrier-slat, pins fixed to the bottom of such frame interiorly, and adapted to work through the conical projections and slat-sockets, and spiral springs encircling the pins and arranged as shown and described.

9. The combination with a carrier having slats provided with a series of match-sockets, a horizontal slidable plate and a lever and cam-shaft for reciprocating said plate, ejecting mechanism proper which is attached to and carried by said plate, and consists of a guide-frame, a series of pins, a bar through which said pins work, and a series of springs that encircle the pins and support the said bar, substantially as described.

10. In a match-machine, the combination with a traveling splint and match carrier, having slats provided with sockets, of a series of devices arranged adjacently in different horizontal planes so as to form collectively an incline over which the matches are carried, substantially as shown and described.

11. In a match-making machine, the combination, with an endless traveling splint and match carrier, having sockets as specified, for reception of the upper ends of splints and of means arranged horizontally and adjacently in different planes, so as to form an incline, as shown and described.

12. The combination with a traveling match-carrier having sockets for matches as specified, of a series of rollers arranged in an inclined plane parallel to each other and beneath the carrier, whereby the shanks of the matches strike first upon the lowest roller, and, riding over it, are forced up in the sockets a certain distance, then successively upon the higher rollers by which they are raised still higher, as shown and described.

13. In a match-machine, the heater for match composition, having a series of three or more openings arranged in zigzag relation, a series of composition vats or pans placed and supported in said openings, and a series of rollers arranged one in each pan, as shown and described, for the purpose specified.

14. The combination with a series of splint-carriers and a water-bath, of a series of composition-vats, a series of annular gears surrounding the respective vats and meshing as shown, stirrers attached to the gears and working in the vats, the vats and gears being so connected that both may be raised together from the water-bath, as shown and described.

15. The combination with a water-bath and splint-carriers, of a series of removable composition-vats, meshing annular gears surrounding the vats and having a shoulder that engages a ledge on the vats, stirrers attached to the gears and working in the vats and a series of removable composition take-up rolls, one for each vat, substantially as shown and described.

FRANK LESTER VAN DUSEN.

Witnesses:
CHAS. A. VAN DUSEN,
M. J. MAHON.